UNITED STATES PATENT OFFICE 2,526,682

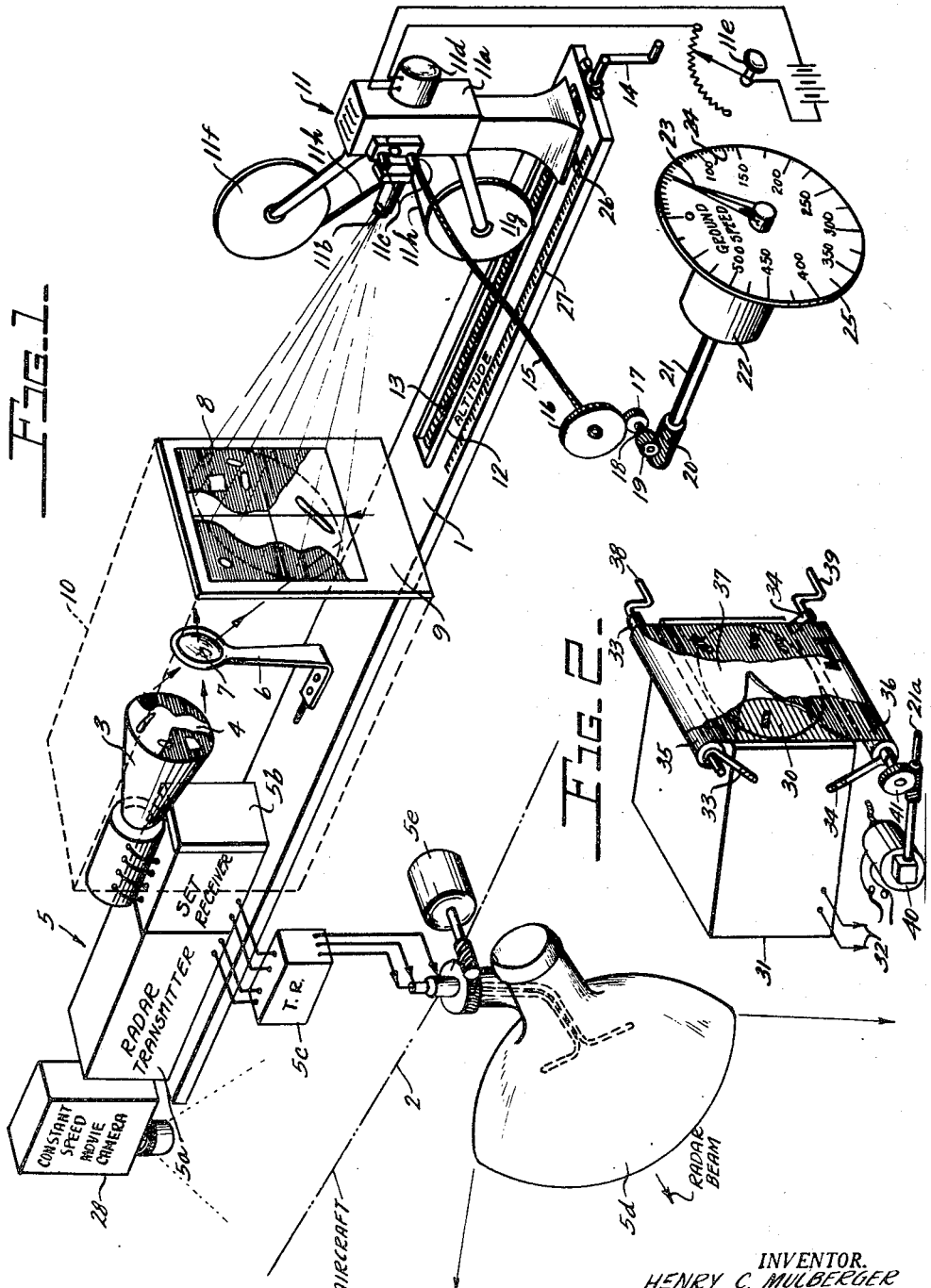

FLIGHT INDICATING INSTRUMENT

Henry C. Mulberger, Milwaukee, Wis., and
James E. Bellitt, Dayton, Ohio

Application April 10, 1946, Serial No. 661,038

8 Claims. (Cl. 343—9)

(Granted under the act of March 3, 1883, as
amended April 30, 1928; 370 O. G. 757)

The invention described herein may be manufactured and used by or for the Government for governmental purposes without the payment to us of any royalty thereon.

This invention relates to improvements in aircraft flight indicating instruments, and more particularly to aircraft ground speed, altitude, and position determining means, having for a primary object, the provision of means accurately determining the true ground speed of an aircraft while flying over the predetermined terrain, particularly when the terrain is not visible from the aircraft.

Another object of the invention is the provision of means for accurately determining the position and direction of movement of an aircraft over an obscured predetermined terrain by the use of radar, employing a terrain scanning transmitter and terrain image receiving fluorescence screen in conjunction with a superimposed picture image of the terrain, moved over the radar screen in concise registration with the radar image of the terrain reproduced thereon.

A further object is the method of accurately determining the ground speed of an aircraft while flying over an obscured predetermined terrain at a predetermined altitude, by the employment of a radar scanned image of said terrain on a radar viewing screen while flying over the terrain at said altitude, superimposing and moving a previously obtained picture strip, having a picture image of said terrain thereon as viewed from the aforesaid altitude, across the radar viewing screen in concise registration with the radar image of said terrain on the viewing screen and determining the true ground speed of the aircraft by the ratio of movement of the picture strip across said viewing screen while in concise registration with the changing radar image on the viewing screen.

A still further object is the provision of means for superimposing a moving picture film image of a terrain to be flown over, taken at a predetermined altitude and ground speed, on a cathode ray radar image of the same terrain recorded on a fluorescent screen, while flying over said terrain, whereby the more prominent objects of the terrain recorded on the moving picture film image will be apparent and relatively orientated into registration with respect to the similar more prominent object in the cathode ray image, even though the ground is not visible from the aircraft, moving the picture image across the fluorescent screen in registration with the cathode ray image recorded thereon by positioning the aircraft in flight over said terrain to maintain the cathode ray terrain image in registration with the moving picture film image whereby less prominent objects on the picture film image, not observable on the cathode ray image, can be located with relation to the more prominent objects of the cathode ray image, and determining the true ground speed of the aircraft by the ratio of movement of picture film image of the terrain, while in concise registration with the changing cathode ray terrain image, to the ratio of movement of the picture film image to the ground speed of the aircraft at the time when the picture film image was obtained.

A still further object is the method of determining the position, direction, altitude, and ground speed of an aircraft while flying over an obscured predetermined terrain by previously obtaining a photographic moving picture strip image record of said terrain while flying thereover at a predetermined ground speed and altitude, relatively coordinating the photographic moving picture strip image into superimposed relation with a radar cathode ray image of said terrain obtained while subsequently flying thereover at the same altitude, and determining the true ground speed from the ratio of movement of the moving picture strip with respect to the ground speed when the said terrain was photographed, to the ratio of movement of the moving picture strip image that is necessary, when superimposed on the radar image, to maintain the photographic picture image in concise registration with the moving radar cathode ray image of said terrain.

A further object of the invention is the utilization of a radar cathode ray fluorescent screen image of a predetermined terrain, while flying an aircraft thereover, to illuminate a photographic picture strip image of the same terrain previously obtained while flying thereover at a predetermined ground speed and altitude, and synchronizing the rate of movement of the photographic picture strip with that of the rate of movement of the changing radar cathode ray screen image to determine the position and ground speed of the aircraft, and to determine the location of less prominent objects recorded on the photographic picture strip with respect to the position of the aircraft, which are not reproduced by the cathode ray fluorescent screen image of the terrain.

A further object is the provision of means for superimposing a radar cathode ray image and a photographic picture strip image of the same terrain on a common fluorescent viewing screen, and moving the photographic picture strip image in synchronized relation, on the viewing screen, with the changing cathode ray image thereon to determine the location of objects on the terrain which are recorded on the photographic image and not recorded by the radar cathode ray image, to obtain a three dimensional effect while viewing the photographic picture strip terrain image by the fluorescent illumination of the cathode ray image, and determine the location, direction of flight, altitude, and ground speed of an aircraft, incident to the concise registration and synchronized movement of the photographic image with the changing cathode ray image on the fluorescent screen.

A further object is the method of orientating an aircraft with respect to objects on a predetermined terrain which are not visible or recorded by a radar terrain scanning scope, by first photographing the terrain to be flown over on a moving picture film strip while flying over the terrain at a predetermined ground speed and altitude while advancing the moving picture film strip at a predetermined rate, subsequently flying over the terrain at the aforesaid altitude while obtaining a radar scanned cathode ray image of the terrain on a terrain viewing screen and projecting the moving picture film strip image of the terrain onto the screen in superimposed relation to the radar cathode ray image while moving the film strip at a predetermined rate to maintain the moving picture image in concise registration with the radar image, and determining the ground speed while flying over said terrain from the ratio of movement of the moving picture strip, while the projected picture image thereof in said superimposed registration with the changing radar terrain image, to the rate of movement of the moving picture film strip when the terrain images were photographed thereon.

Other objects and advantages of the invention will become apparent from the following description taken in connection with the accompanying drawing, in which like reference characters refer to like parts in the several figures of the drawings.

Fig. 1 is a perspective view, somewhat diagrammatically illustrating a preferred embodiment of the invention.

Fig. 2 is a perspective view of a modified form of the invention.

Referring more particularly to Fig. 1 of the drawing, the reference numeral 1 indicates an elongated support or base member adapted to be mounted within the fuselage 2 of an aircraft, preferably in a location that is convenient to the pilot or the navigator.

The support 1 has a conventional cathode ray tube 3 of a PPI radar scan-type radar set mounted thereon, a cathode ray tube 3 being provided, having a fluorescent screen 4, for receiving a radar cathode ray image thereon of the terrain below the aircraft.

A conventional PPI scan type, radar transmitting and receiving set is provided, as indicated at 5, including a transmitter 5a, receiver 5b, TR switch 5c, and a transmitting receiving antenna, in the form of a paraboloidal reflector of the dipole type, indicated at 5d, rotated by a suitable scanning motor 5e, to scan a predetermined circular area of the terrain below the aircraft, as the aircraft flies thereover. Radar impulses are sent out by the transmitter 5a and the echoes are received through the receiver 5b, causing the cathode ray beam, not shown, to be deflected, recording to the outline of the more prominent objects on the terrain below, onto the fluorescent screen 4 of the cathode ray tube 3.

Mounted on an adjustable post or standard 6, upstanding from the base 1, in front of the fluorescent screen 4, is an optical projection means in the form of a lens 7 for projecting the recorded terrain image of the cathode ray tube fluorescent screen 4 onto a translucent viewing screen 8, mounted on the base 1 in a suitable supporting frame 9. A casing or closure member 10 is provided for enclosing the space between the cathode tube 3 and the common viewing screen 8, preventing any stray illumination, other than that which is received from the cathode ray tube image, from reaching the rear surface of the viewing screen 8.

By adjusting the position of the lens standard 6, and the distance between the viewing screen 8 and the cathode ray tube screen 4, the relative size of the projected radar terrain image on the surface of the viewing screen is determined, and once this adjustment is made to determine the relative size of the radar terrain image to the altitude, the adjustment is fixed and does not have to be changed.

A projector 11, in the form of a moving picture machine is slidably mounted on the base 1 in a suitable guide opening 12, formed in the base, the projector being adjustable toward or away from the common projection screen 8 by the actuation of a threaded adjusting rod or screw 13, suitably journaled in the base 1 and extending through the center of the guide slot 12, a threaded connection being provided between the screw 13 and the base portion of the projector. An adjusting crank 14 is secured to the screw 13 for rotating the screw to adjust the distance between the projector 11 and the screen 8. The projector 11 is somewhat conventional in form, having a lamp box 11a containing an illuminating source, a suitable optical projection or lens system 11b, moving picture film advancing sprockets 11c, operated at variable speeds by the motor 11d under the control of a rheostat 11e. Upper and lower film reels 11f and 11g are provided on the projector, suitably driven in a conventional manner for unreeling the film 11h from the upper reel 11f and winding the same onto the lower film reel 11g as the projector is operated.

One of the film advancing sprockets 11c, preferably the lower one has a flexible drive shaft 15 connected thereto, to rotate therewith in a definite ratio to the rotation of the upper film advanced sprocket 11c, and thereof in a definite ratio to the rate of movement of the film strip 11h through the projector 11. Fixed to the other end of the flexible drive shaft 15 is a suitably journaled large gear 16, meshing with a small gear 17 which is carried on a suitably journaled shaft 18 having a skew gear 19 fixed thereon. The skew gear 19 meshes with a second skew gear 20 fixed to a ground speed indicator drive shaft 21, for driving a true ground speed indicator device as indicated at 22. The ground speed indicator device 22 is also somewhat conventional, being similar to a speedometer, the speed of rotation of the shaft 21 determines the relative position of the ground speed indicating pointer 23 with respect to predetermined ground speed indicating indicia 24, located on the dial or disc 25.

The base of the projector 11 is provided with an altitude indicating pointer 26, located for selective registration with predetermined indicia on an altitude indicating scale 27 disposed adjacent the guide opening or slot 12 formed in the base 1. The relative size of the picture images, as projected onto the front face of the viewing screen by the projector 11, with respect to the size of the radar images of the terrain projected onto the rear face of the screen 8, is a function of the altitude at which the aircraft is being flown while the radar images are obtained.

The film or picture strip 11h is initially obtained by flying over the terrain at a predetermined altitude and at a predetermined ground speed when the terrain is sufficiently visible for photographic purposes. While it is preferable to obtain the picture strip while flying over the terrain in a fast scouting or pursuit plane, without the projection apparatus therein as disclosed in Fig. 1, for purposes of illustration a moving picture camera of the constant predetermined speed type is shown at 28 in Fig. 1 of the drawings, in conjunction with the combined radar terrain image and picture strip terrain image projection apparatus, the camera having a coverage area, with respect to the position and altitude of the aircraft above the terrain, substantially equal to the coverage area of the PPI scanning radio beam when the aircraft carrying the radar and projected apparatus is flying over the terrain at this same altitude in the same position.

In obtaining the photographic picture strip 11, the aircraft is flown on a predetermined course, at a predetermined altitude, and ground speed, and the picture images are successively taken at a predetermined uniform rate for a predetermined unit of time. The photographic film strip is then processed in the usual manner to obtain a continuous photographic record in the form of an elongated picture strip of the terrain. When the picture strip is superimposed on the viewing screen 8 with the cathode ray image of the PPI scan radar set carried by the aircraft as flown over the terrain at the same speed and altitude at which the pictures on the strip were originally obtained. The picture images of the terrain can be brought into concise registration with the cathode ray screen image of the terrain.

By adjusting the position of the screen 8 and the lens support 6, as shown in Fig. 1, and also changing the position of the projector 11 on the supporting base 1 by the manipulation of the hand crank 14, the projected picture strip images of the terrain can be adjusted to the same relative size as the radar cathode image, and the predetermined altitude indicia on the scale 27, when the radar and film images are the same relative size will position the pointer 26 opposite to the true altitude at which the aircraft is flying as indicated on the scale 27. Ascending above, or descending below the altitude indicated on the scale 27 will cause the radar cathode ray screen image to enlarge or decrease in size, making it necessary to adjust the crank 14 to move the projector 11 away from or toward the screen 8 to again adjust the projected film strip image to the same relative size as the radar terrain image, so that concise registration of the two images can be accomplished and movement of the projector adjusts the pointer to indicate the new or adjusted altitude of the aircraft as indicated on the scale 27.

By adjusting the course and position of the aircraft over the terrain, when the picture images of the terrain are the same relative size as the radar image scanned terrain, prominent details on the radar image are caused to shift and can easily be brought into concise registration with the same prominent details of the projected picture strip image. Adjustment of the rheostat 11e varies the rate of movement of the terrain picture strip film through the projector, and also varies the apparent rate of change of the terrain image projected on the screen 8 with the radar terrain image. By properly adjusting the position of the rheostat 11e, the superimposed photographic picture strip image can be maintained in concise registration, on the screen 8, with a moving radar terrain image, on the screen 8, the rate of rotation of the film advance sprocket 11c, driving the flexible shaft 15, gears 16 to 20, and drive shaft 21, operates the true ground speed indicating mechanism, to adjust the pointer 23 to indicate the true ground speed of the aircraft on the scale 24.

Should the radar and projection apparatus equipped aircraft be flying over the predetermined terrain at the same altitude, position, ground speed, and in the same direction, as the aircraft was operated when the photographic film strip was obtained and if the rheostat 11e has been adjusted to advance the film strip 11h through the film projector 11 at the same rate that it was moving through the camera 28 when the picture of the terrain was obtained, the true ground speed indicator pointer 23 will indicate a true ground speed which is identical to the true ground speed at the time when the terrain photographic record was obtained. If the rate of apparent movement of the changing radar, cathode ray, terrain image projected on the screen 8, makes it necessary to reduce or increase the rate of movement of the picture strip film through the projector 11, in order to keep the photographic picture image the concise registration with the radar image, this change in the rate of movement of the film advance will, through the ground speed indicator, indicate the true ground speed of the aircraft at the time when the picture image of the terrain are maintained in concise registration with the changing radar image of the terrain.

Since the photographic picture strip record of the terrain will disclose substantially all of the objects and outlines on the terrain, the more prominent objects on the photographic picture strip record, such as the outlines between land and water, coastline contours and very large prominent structures can be easily matched with similar outlines and structures on the radar cathode ray image viewing screen, and from the positions of these more prominent objects and outlines, the relative details and positions of the less prominent objects, recorded on the photographic picture strip only, can be easily located with respect to the aircraft while the aircraft is flying over the terrain, even though the terrain is not visible from the aircraft.

In military operations, while flying over, and possibly landing on foreign or enemy territory, especially when the terrain is obscured, such as at night, or in fog, it is necessary to know with accuracy the true ground speed, altitude, and direction of flight of the aircraft, and in addition, to note the location of many objects or hazards located on the terrain, not visible or recordable on the radar screen. Once the photographic picture strip has been obtained, copies of the picture strip can be made and furnished to other military aircraft, equipped with the apparatus shown in the drawings, and these aircraft may be successfully flown over the same terrain such as in air borne invasions, bombing missions, etc., especially at night when the terrain is obscured even though the pilots are not familiar with the terrain, these aircraft being capable of operating as efficiently under these conditions as when the terrain is clearly visible, by the simple procedure of the matching the radar image of the terrain with the previously obtained photographic record of the terrain, and manipulating the aircaft to keep the changing radar image of the terrain in concise registration with the picture image of the terrain on the film strip 11h.

While it has been assumed in the foregoing, that the photographic picture strip is first obtained by flying over the terrain at a predetermined ground speed, altitude, and on a predetermined course, during the photographing of the terrain, the picture strip may also be obtained artificially by preparing the picture strip of the terrain to be flown over, somewhat like a map, scaled down to the same scale or ratio, with respect to altitude, as the relative size of the radar, cathode ray beam image obtained at the same altitude, and then predetermining the rate of movement for the picture strip relative to the true ground speed of the aircraft, which is necessary to keep the rate of change of the radar image identical with the rate of change of the terrain picture strip image, incident to movement of the picture strip while the aircraft is travelling at the aforementioned true ground speed as indicated on the ground speed indicator 22. Once this ratio is established, and the radar image of the terrain is brought into concise registration with the picture image, a relative change in size, or acceleration or retardation of the changing radar image with respect to the picture strip image indicates a change in altitude, or ground speed of the aircraft, so that shifting the projector 11 to adjust the projected image to the size of the radar image will adjust the position of the pointer 22 to indicate the true altitude on the scale 27. Adjustment of the rheostat 11e changes the rate of apparent movement of the picture image to agree with the rate of movement, or change of the radar image and immediately adjusts the position of the ground speed indicator 22 to show the true ground speed of the aircraft.

Referring to the modification shown in Fig. 2, the reference numeral 30 indicates a cathode ray tube, fluorescence screen, similar to screen 4 of the cathode ray tube 3, of a PPI scan, radar apparatus, such as shown in Fig. 1, the tube 30 being mounted in a suitable casing 31 and connected to a conventional PPI scan radar receiver, not shown in this modification, suitable conductors as indicated at 32 being provided for connection to the radar set. The casing 31 is provided with two pairs of off-set brackets 33 and 34, located at opposite sides of the screen, in which are journaled film spools 35 and 36 for supporting and advancing a continuous picture strip 37 of a terrain to be subsequently flown over, in the manner set forth in the description relating to Fig. 1.

In this form of the invention the picture strip 37 is disposed in juxtaposed relation to a fluorescent screen 30 of the cathode ray tube 31, and illumination of the picture strip is due to the brightness or illumination of the fluorescent screen 30 of the cathode ray tube 31 by the radar scanning beam, this illumination providing a somewhat three-dimensional effect on the terrain images recorded on the picture strip 37, especially if they are photographic negative or positive images of the terrain.

Crank members 38 and 39 are provided for rotating the two picture strip winding reels 35, 36, and power means 40, in the form of variable speed electric motor may be provided for rotating the film spool 36 to advance the picture strip 37 across the fluorescent screen 34 at the proper rate to keep the terrain images thereon in proper and concise registration with the similar changing radar images of the terrain, impressed on the fluorescent screen 30. A suitable reduction gear drive as indicated at 41, may be provided between the motor 40 and the spool 36 to maintain the ratio of movement of the film strip relatively slow with respect to the rotation of the armature of the motor 40. If desired, this motor may be connected to a ground speed indicating device, such as shown at 22 in Fig. 1, so that the ratio of rotation of the motor, with respect to the rate of change, or movement of the picture image across any fixed point upon the fluorescent screen, is a function of the true ground speed of the aircraft, when the picture strip image and the cathode ray terrain image are changing at the same speed with respect to aforesaid fixed point on the screen.

In this form of the invention, the images on the picture strip are much larger than those employed in the projection method set forth in connection with Fig. 1, and the strip may consist of a plurality of successively obtained photographs or pictures of the terrain, subsequently joined together to form the continuous picture strip record of the terrain to be later flown over.

Assuming that it is desired to fly over the terrain represented on the picture strip 37 while the terrain recorded thereon is obscured, the cranks 38 and 39 are manipulated to dispose the first position of the terrain picture image across the radar screen 30. The aircraft is then flown and directed so as to bring the radar scanned fluorescent screen image of the terrain into concise registration with the picture strip image of the terrain, by matching the more prominent outlines of the radar or cathode ray image, such as shore or coast lines with these same outlines on the picture strip image. When the aforesaid outlines are brought into superimposed registration, the aircraft will be at the same altitude and position as the aircraft was when the picture strip image was originally obtained, or at an altitude representative of the relative size or scale of the picture strip image.

In order to fly the aircraft across the terrain, it is only necessary to advance the picture strip image in phase with the changing radar image, and manipulate the aircraft to keep the radar scanned terrain image in concise registration with the picture image. Small objects on the picture strip such as buildings, mountains, etc., not shown on the radar image, may be easily located on the picture strip with respect to the position of the aircraft, as observed relative the more prominent objects and outlines that are clearly discernible on the radar screen in superimposed registration with the same outlines and objects on the picture terrain image.

We have illustrated and described preferred satisfactory embodiments of the invention, but it will be understood that changes may be made therein within the spirit and scope of the invention as defined in the appended claims.

We claim:

1. In an aircraft ground speed indicator, a support movable across a predetermined terrain at a predetermined altitude, radar terrain scanning and viewing screen means carried by said support for obtaining a changing radar image of the terrain as the support moves over the terrain, a picture strip having a picture image thereon of the said terrain taken at a predetermined altitude while moving over said terrain at a predetermined ground speed, means for superimposing said terrain picture image on said changing radar terrain image in identical registration therewith, picture strip moving means for moving said picture strip across said radar terrain viewing screen means at predetermined variable rates representative of true ground speed with respect to the rate of movement of the support over the terrain when the terrain picture image was obtained thereon in order to maintain exact registration of the picture strip image with the changing radar terrain image, and ground speed indicating means operable by said picture strip moving means calibrated relative to the movement of the picture strip moving means to indicate variations in the rate of movement of said picture strip image over said radar image viewing screen means to indicate the true ground speed over said terrain relative to the rate of movement of the picture image when maintained in concise registration with the radar terrain image on the viewing screen.

2. A radar terrain scanning and position indicating means for an aircraft including a radar terrain image viewing screen for receiving a radar scanned terrain image thereon, means for superimposing a picture image of a predetermined terrain onto said viewing screen when said aircraft is flying over said terrain, means for moving said superimposed picture image across said screen at predetermined different uniform rates, means operable by said picture strip moving means for indicating the ground speed of said aircraft relative to the necessary rate of movement of the superimposed picture image across the screen to maintain said superimposed picture image in exact registration with the changing radar image of said terrain recorded on said viewing screen, said last named means comprising true ground speed indicating means operable by said terrain picture image moving means in predetermined ratio to the rate of movement of said superimposed picture image across said radar terrain viewing screen calibrated to indicate the true ground speed of the aircraft when said superimposed picture image is moved across the screen in registration with the changing radar image of the terrain as the aircraft moves across said terrain.

3. Apparatus as claimed in claim 2 including means for varying the relative size of the superimposed terrain picture image to equal the size of the radar terrain image including means operable by said picture image relative size varying means for indicating the altitude of the aircraft in predetermined ratio to the relative size of said radar and superimposed terrain picture images when the same are identical in size.

4. In an aircraft speed and position determining apparatus, a radar system therefor including a radar scanning transmitter, receiver and radar terrain image viewing screen for recording a radar image of the terrain below on said screen as the aircraft is flown over said terrain, said radar scanning transmitter, and receiver having a predetermined scanning area ratio to the altitude at which the aircraft is flown, an elongated picture strip having a continuous picture image of said terrain thereon, representative of a predetermined altitude with the same relative coverage area to altitude ratio as the aforesaid radar scanned image coverage area to altitude ratio, means for superimposing said picture strip terrain image on said radar image viewing screen in concise registration with the radar terrain image when the aircraft is over the terrain disclosed on the picture strip at the same altitude at which the terrain picture image on the picture strip was obtained, true ground speed indicating means for moving said picture strip past a fixed point on said viewing screen in predetermined ratio to the true ground speed of the aircraft, whereby the location of the aircraft over said terrain is accomplished by positioning the aircraft to dispose radar the scanned area of the terrain on the viewing screen in concise registration with the superimposed picture strip image of the terrain and the relative rate of movement the picture image of the picture strip across said viewing screen while in concise registration with said changing radar image determines the true ground speed of the aircraft.

5. A method of determining the ground speed, position, and altitude of an aircraft while flying over a predetermined terrain when the terrain is obscured, which comprises; first flying over said terrain along a predetermined ground track at a predetermined altitude and ground speed when the terrain is not obscured; simultaneously photographing said terrain at a predetermined angle on a photographic picture strip moving at a uniform predetermined rate during a predetermined time interval to obtain a photographic picture image of said terrain throughout said flight whereby the relative rate of movement of the picture strip during said predetermined time interval is a function of the ground speed of the aircraft during said flight and the relative size ratio of the terrain area image on said picture strip is a direct function of the altitude of the aircraft during said flight; processing said photographic picture strip to obtain a visible photographic image of the terrain flown over; subsequently flying over said terrain at the altitude at which the picture images on said picture strip were photographed; simultaneously obtaining a radar scanned image of said terrain at the angle with respect to the line of flight of the aircraft equal to the angle at which the terrain was photographed; simultaneously projecting the picture strip image of said terrain and the radar terrain image during the subsequent flight to a common viewing point to obtain a superimposed image of said picture strip image and said radar scanned image; adjusting the side of said projected picture strip image to the same size as the projected radar image; adjusting the position and direction of movement of the aircraft above the terrain to adjust said radar scanned image into concise registration with the projected picture strip image; moving said picture strip to move the terrain image thereon to maintain the same in said concise registration with the changing radar image; whereby the ground speed over the terrain on said subsequent flight is a function of the relative ratio of movement of the picture strip image at the time the terrain images were photographed thereon relative to the rate of movement of the picture strip required to maintain the picture strip image in concise registration with the changing radar scanned image.

6. The method of determining the true ground speed, direction, and altitude of an aircraft while flying over an obscured predetermined terrain which comprises photographing said terrain on a picture strip moving at a predetermined uniformed rate while flying over the same terrain when not obscured, at a known ground speed during a predetermined time period; whereby the ratio of movement of the picture strip is a function of the true ground speed at the time the picture images are recorded thereon and the size of the recorded terrain area on the picture strip is a function of the altitude; subsequently flying over said terrain; simultaneously obtaining a radar scanned picture image of said terrain; superimposing said picture strip terrain image on the radar scanned image in concise registration therewith; moving said picture strip to maintain the terrain image thereon in concise registration with the changing radar scanned image; whereby the true ground speed and altitude of said subsequent flight relative to the rate of movement of the picture strip necessary to maintain the terrain image thereon in concise registration with said changing radar scanned terrain image is a function of the rate of movement of the picture strip with respect to the ground speed over said terrain when said picture image was recorded on said picture strip.

7. The method of determining the true ground speed of an aircraft while flying over a predetermined terrain which comprises; first flying over said terrain at a uniform predetermined ground speed direction and altitude and simultaneously photographing the said terrain on a photographic picture strip moving at a uniform predetermined rate to obtain a photographic picture image of said terrain taken at a predetermined speed; subsequently flying over said terrain and simultaneously obtaining obtaining a radar scanned image of said terrain; superimposing said picture strip image of the terrain on said radar scanned image with said picture strip and radar scanned images in concise registration; moving said picture strip at a predetermined rate to maintain the terrain image thereon in registration with the said changing radar scanned terrain image, whereby the difference in the speed of said subsequent flight over said terrain with the radar scanned and picture strip images in registration is a function of the relative difference in the ratio of movement of said picture strip between its movement when the terrain image was photographed thereon and the necessary rate of movement of the picture strip in order to maintain said photographed terrain image thereon in concise registration with the said changing radar scanned image throughout said subsequent flight denoting the true ground speed during said subsequent flight over said terrain.

8. The method of determining the true ground speed, direction, altitude and the location of an aircraft while flying over a predetermined terrain which comprises; first flying over said terrain at a predetermined ground speed, altitude, and direction; simultaneously photographing said terrain on a photographic picture strip moving at a uniform rate throughout a predetermined time interval; whereby the relative ratio of movement and direction of movement of the photographic strip to the rate and direction of movement of the aircraft over said terrain during the said time interval is a function of the true ground speed and direction of the aircraft during said flight over said terrain, and the relative size of the photographed terrain area on the photographic picture strip to the size of the terrain area photographed is a function of the altitude at which the picture strip images were photographed; subsequently flying over said terrain and simultaneously obtaining a radar scanned image of said terrain; simultaneously superimposing the picture strip image on said radar scanned terrain image; adjusting the position, flight direction and altitude of the aircraft during said subsequent flight to adjust the size, and position of the radar scanned image into concise registration with the photographic strip images to maintain the former altitude and location during said subsequent flight over the terrain; moving the picture strip to keep the said terrain image thereon in concise registration with the changing radar scanned image; whereby the location, ground speed heading, and altitude of the aircraft during said subsequent flight while said images are in said superimposed registration is a function of the rate of movement of the picture strip and apparent location and direction of motion of the terrain in the picture strip image relative to the location of the aircraft and the rate and direction of movement of the picture strip and the aircraft at the time when the images were photographed on the picture strip.

HENRY C. MULBERGER.
JAMES E. BELLITT.

REFERENCES CITED

The following references are of record in the file of this patent:

UNITED STATES PATENTS

| Number | Name | Date |
| --- | --- | --- |
| 1,636,112 | Schufftan | July 19, 1927 |
| 1,945,926 | Tolhurst | Feb. 6, 1934 |
| 2,209,191 | Dearing | July 23, 1940 |
| 2,403,562 | Smith | July 9, 1946 |
| 2,406,751 | Emerson | Sept. 3, 1946 |
| 2,428,427 | Loughren | Oct. 7, 1947 |